(12) United States Patent
Sugiyama et al.

(10) Patent No.: US 8,584,561 B2
(45) Date of Patent: Nov. 19, 2013

(54) METHOD FOR MANUFACTURING IMAGING ELEMENT

(75) Inventors: Takashi Sugiyama, Tokyo (JP); Atsuhiko Minekawa, Nabari (JP); Shigetoshi Kitabayashi, Hyogo (JP)

(73) Assignee: Stanley Electric Co., Ltd., Tokyo (JP)

( * ) Notice: Subject to any disclaimer, the term of this patent is extended or adjusted under 35 U.S.C. 154(b) by 329 days.

(21) Appl. No.: 13/119,477

(22) PCT Filed: Sep. 16, 2009

(86) PCT No.: PCT/JP2009/004639
§ 371 (c)(1),
(2), (4) Date: Mar. 17, 2011

(87) PCT Pub. No.: WO2010/032450
PCT Pub. Date: Mar. 25, 2010

(65) Prior Publication Data
US 2011/0162495 A1    Jul. 7, 2011

(30) Foreign Application Priority Data
Sep. 18, 2008   (JP) ................ 2008-239255

(51) Int. Cl.
*B26D 1/00*    (2006.01)
(52) U.S. Cl.
USPC .................................. 83/13; 83/55

(58) Field of Classification Search
USPC .............. 83/55, 13, 684, 956, 171, 337, 566; 234/1; 353/10, 71, 99; 359/850, 402
See application file for complete search history.

(56) References Cited

U.S. PATENT DOCUMENTS

| | | | | |
|---|---|---|---|---|
| 3,756,880 A | * | 9/1973 | Craczyk | 156/73.3 |
| 8,057,043 B2 | * | 11/2011 | Maekawa | 353/10 |
| 2007/0069003 A1 | * | 3/2007 | Takemasu et al. | 234/1 |

FOREIGN PATENT DOCUMENTS

| | | |
|---|---|---|
| FR | 2786714 A1 | 6/2000 |
| JP | 08-132396 | 5/1996 |
| JP | 10-193299 | 7/1998 |
| JP | 2000-326144 | 11/2000 |
| WO | 2007/116639 | 10/2007 |

* cited by examiner

*Primary Examiner* — Ghassem Alie
(74) *Attorney, Agent, or Firm* — Rankin, Hill & Clark LLP

(57) ABSTRACT

Provided is an accurately processed imaging element that can be readily manufactured for saving time and cost. A blade section 2 in which projecting punch blades 22 are arranged on a metal block 21, each punch blade having two sides 22*a* and 22*b* corresponding to the two mirror surfaces 31*a* and 31*b* of micro holes 31 to be formed in a substrate 3, is lowered for pressing the blades into contact with the substrate 3 with a lifting section 13 and punching the substrate 3 with the punch blades 22, while being vibrated with ultrasonic oscillation section 12.

7 Claims, 4 Drawing Sheets

METHOD FOR MANUFACTURING IMAGING ELEMENT

TECHNICAL FIELD

The present invention relates to a method for manufacturing an imaging element comprising a flat substrate with a plurality of vertical micro through-holes, each having two inner mirror surfaces perpendicularly arranged for bending a light beam passing through the hole, such that a real image of an object or a projected image disposed in the space facing one side of the flat substrate is formed in a space facing the other side.

BACKGROUND ART

According to a conventionally known method for manufacturing these kind of imaging elements, a metal mold having arranged tubelike units is formed by nano-processing and the neighboring two surfaces (the sides corresponding to the mirror surfaces of the micro holes) of the tubelike units are processed into mirror surfaces with a plane roughness of not larger than 50 nm, which are reversed and transferred by nano-imprinting or electrocasting using the mold for forming a plurality of micro through-holes with a predetermined pitch on the substrate. (Refer to International Publication No. WO 2007/116639 (paragraph 0032, in particular)).

DISCLOSURE OF THE INVENTION

Problems to be Solved by the Invention

However, in the conventional method for manufacturing imaging elements, in addition to fabricating a metal mold by nano-processing, reversing and transferring by nano-imprinting or electrocasting are required. Furthermore, in order to separate the imaging element from the mold, melting the mold is practically required. Consequently, the disadvantage of the method is that an enormous amount of cost and time is required for manufacturing an imaging element.

On the other hand, depending on processing accuracy of the mirror surfaces or arranging accuracy of the micro holes of an imaging element, deformation of a formed real image or decrease in brightness may be caused. Thus, due to the need for preserving a level of processing accuracy of the micro holes, it is difficult to simplify the manufacturing process.

Considering the circumstances described above, an object of the present invention is to provide a simplified method for manufacturing an accurately processed imaging element for saving cost and time.

Means for Solving the Problems

The present invention provides a method for manufacturing an imaging element comprising a flat substrate with a plurality of vertical micro through-holes, each having two inner mirror surfaces perpendicularly arranged for bending a light beam passing through the hole such that a real image of an object or a projected image disposed in the space facing one side of the flat substrate is formed in a space facing the other side, comprising: pressing a blade section in which a plurality of projecting punch blades are arranged, each punch blade having at least two sides corresponding to the mirror surfaces, into contact with the substrate while ultrasonically vibrating the blade section; and punching the substrate with the punch blades (the first aspect of the invention).

According to the method for manufacturing an imaging element of the first aspect of the invention, a plurality of micro holes is formed on a substrate by punching the substrate using projecting punch blades, each having at least two sides corresponding to the mirror surfaces. As a result, the imaging element is readily manufactured by a simplified device configuration so that cost and time for manufacturing the element can be substantially saved.

In that case, the punch blades are ultrasonic-vibrated. Consequently, since cutting performance during punching is enhanced due to a synergetic effect of the vibration and the frictional heat between the blade and the substrate resulting from the vibration, highly smoothed minor surfaces precisely perpendicular to the surface of the substrate can be produced.

As described above, according to the method for manufacturing an imaging element of the present invention, an accurately processed imaging element can be readily manufactured for saving cost and time.

The present invention provides a method for manufacturing an imaging element comprising a flat substrate with a plurality of vertical micro through-holes, each having two inner mirror surfaces perpendicularly arranged for bending a light beam passing through the hole such that a real image of an object or a projected image disposed in the space facing one side of the flat substrate is formed in a space facing the other side, comprising: pressing a blade section in which a plurality of projecting punch blades are arranged, each punch blade having at least two sides corresponding to the minor surfaces, into contact with the substrate while ultrasonically vibrating a pedestal with the substrate fixed thereon; and punching the substrate with the punch blades (the second aspect of the invention).

In the second aspect of the invention of the method for manufacturing an imaging element, the ultrasonic vibration is applied to the pedestal securing the substrate instead of to the punch blades. Consequently, since cutting performance during punching is enhanced as in the case of vibrating the punch blades, highly smoothed mirror surfaces precisely perpendicular to the surface of the substrate can be produced. As described above, according to the method for manufacturing an imaging element of the present invention, an accurately processed imaging element can be also readily manufactured for saving cost and time.

In a preferred aspect of the present invention, the substrate used in the method for manufacturing imaging elements according to the first or second aspect of the invention is a thin metal plate (the third aspect of the invention).

In the aspect of the invention using a metal for the substrate, the punched surfaces can have a higher reflectance compared to the surface of a substrate made of other material. Since punched surfaces are made into mirror surfaces, no reflection coating is required. As a result, an accurately processed imaging element can be readily manufactured for saving cost and time.

Examples of the metal for use include one metal selected from aluminum, stainless steel, chromium, and molybdenum or an alloy of the two or more metals selected from these metals (the fourth aspect of the invention).

Alternatively, in a preferred aspect of the present invention, the substrate used in the method for manufacturing an imaging element according to the first or second aspect of the invention is a thin resin plate and after the substrate is punched with the punch blades the mirror surfaces are coated with a reflective coat (the fifth aspect of the invention).

In the aspect of the invention using a resin for the substrate, the punched surfaces have a lower reflectance compared to the surface of a substrate made of metal, for example. However, by coating the punched surfaces with a reflective coat, mirror surfaces having a high reflectance are formed on a resin member, so that an accurately processed imaging element can be manufactured.

BEST MODE FOR CARRYING OUT THE INVENTION

Figure 1:
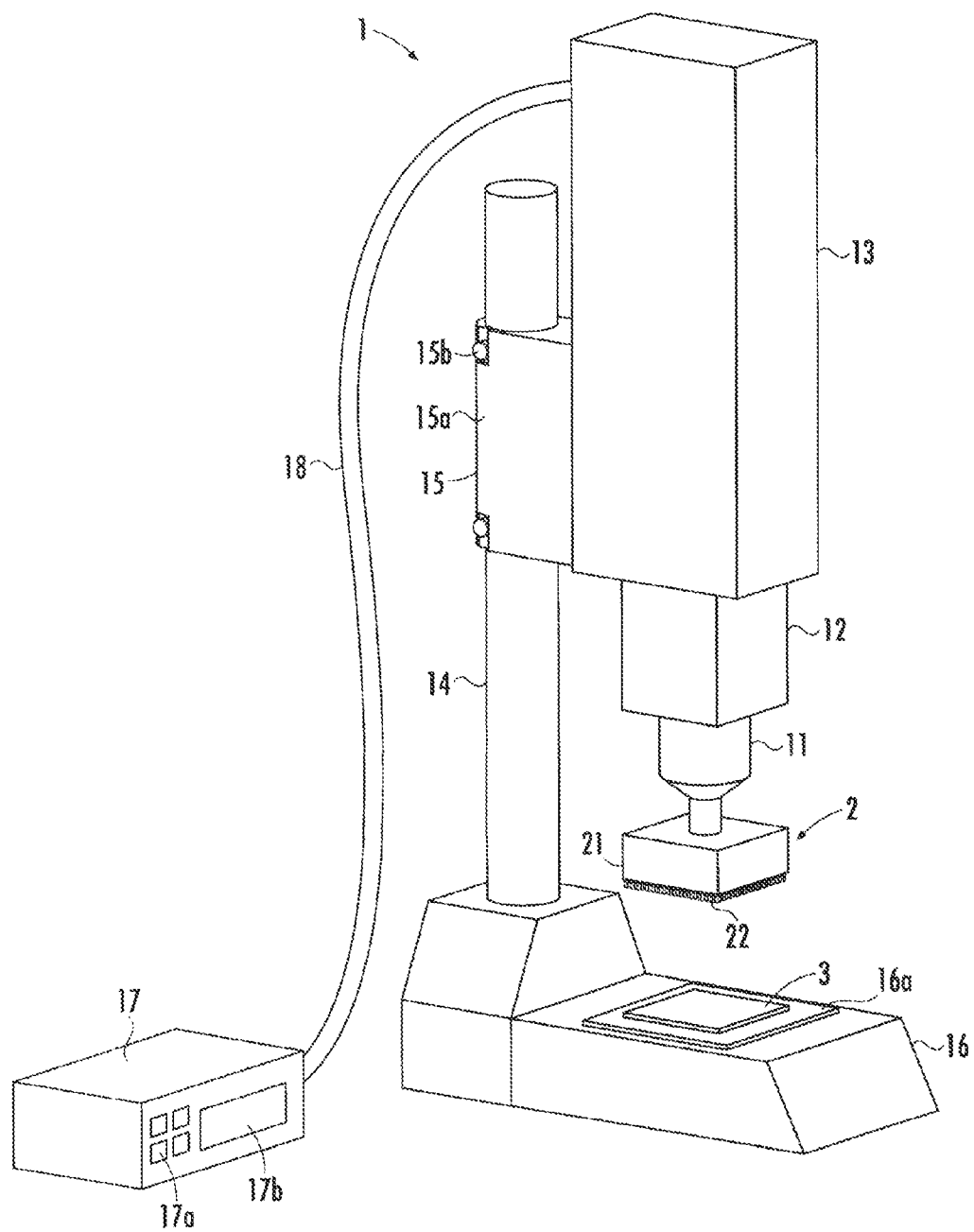
FIG. 1 illustrates a device configuration for a method for manufacturing an imaging element according to an aspect of the present invention.

With reference to FIG. 1, a device configuration for manufacturing an imaging element is described as an embodiment of the present invention. The device for manufacturing an imaging element comprises an ultrasonic welder 1 and a blade section 2 that is mounted on a horn 11 of the ultrasonic welder 1.

The ultrasonic welder 1 comprises an ultrasonic oscillation section 12 that applies ultrasonic vibration to the horn 11, a lifting section 13 that raises or lowers the horn 11 and the ultrasonic oscillation section 12 as a unit, a supporting section 15 that supports the lifting section 13 at an adjustable height with a column 14, a pedestal 16 that perpendicularly supports the column 14 under the horn 11, and a controller 17 that controls actuations of the ultrasonic oscillation section 12 and the lifting section 13. The controller 17, the ultrasonic oscillation section 12, and the lifting section 13 are connected with a cable 18, through which signals are mutually transmitted.

The ultrasonic oscillation section 12 comprises an internally disposed ultrasonic oscillator not shown in the drawing that receives control signals from the controller 17 to vibrate the horn 11 at a predetermined oscillating frequency.

The lifting section 13 comprises a servomotor and a ball screw connected to the main shaft (rotor) not shown in the drawing. By screwing the ball screw into a female screw disposed on the frame of the ultrasonic oscillation section 12, the ultrasonic oscillation section 12 is raised or lowered with the servomotor.

The supporting section 15 comprises a side frame 15a that is connected to the lifting section 13 and a locking screw 15b that fixes the side frame 15a on the column 14, so that the height positions of the side frame 15a and the lifting section 13 are adjustable using the locking screw 15b.

The pedestal 16 comprises a flat table 16a on the top, so that a substrate to be processed (work) 3 can be placed on the table 16a.

The controller 17 comprises an operation panel 17a and a display section 17b, so that the oscillating frequency of the ultrasonic oscillator in the ultrasonic oscillation section 12 and the outputs of the servomotor in the lifting section 13 (rotating speed and torque) may be variably set through the manipulation of the operation panel 17a by an operator. Control states and the like of the ultrasonic oscillation section 12 and the lifting section 13 are displayed on the display section 17b.

Figure 2:
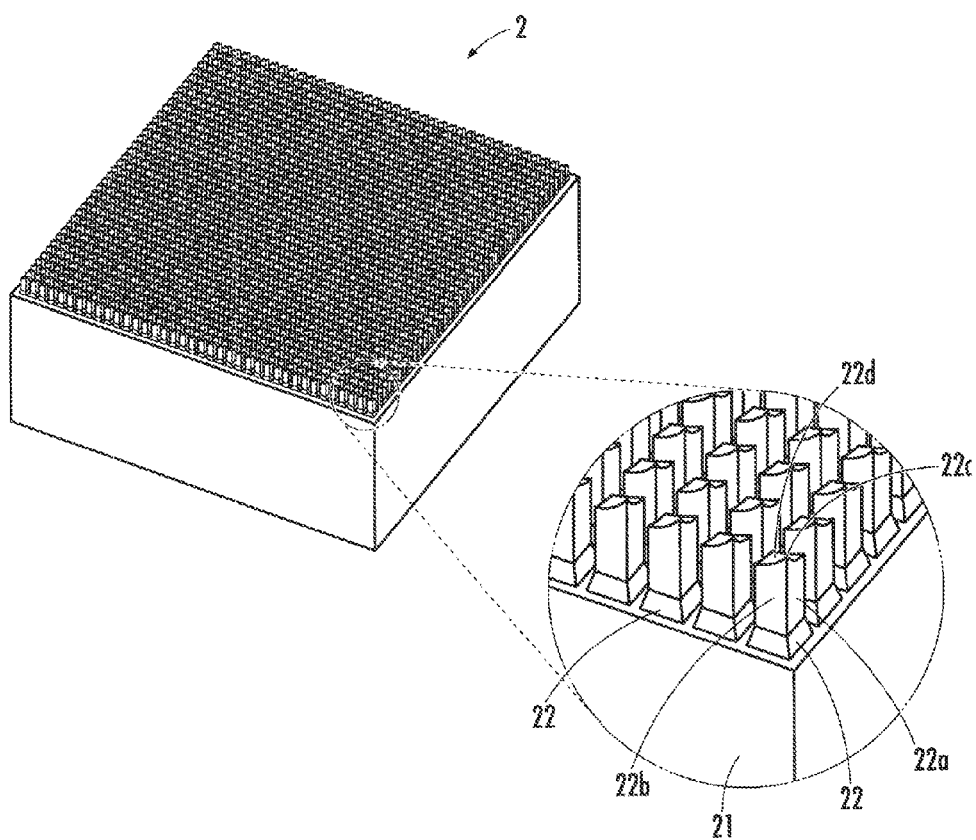
FIG. 2 is a perspective view of punch blades.

As shown in FIG. 2, the blade section 2 comprises punch blades 22 arranged in grid pattern on a surface of a thick plate-like metal block 21. The backside of the metal block 21 is fixed on the horn 11 with means for fixing not shown in the drawing.

The shape of the punch blade 22 is a four-sided pyramid having no top. Among the four sides, two neighboring sides 22a and 22b uprise perpendicularly to the metal block 21 and the angle between the two sides 22a and 22b is perpendicular to each other. The one end of the corner composed of the two sides 22a and 22b makes a tip 22c of the punch blade 22. A counterbored portion 22d is formed by arc-circularly counterboring along the sides 22a and 22b from the tip 22c.

In an embodiment of the present invention, the punch blade 22 has a side length of 100 and the punch blades 22 are arranged lengthwise and crosswise on the metal block 21 allowing a 100-μm spacing between the neighboring blades.

In an embodiment of the present invention, the punch blade 22 was formed by cutting the surface of the metal block 21 with a bite. Alternatively, the punch blade 22 may be formed with a wire-electrical discharge machine or by polishing using a grinding stone. Material for the metal block 21 and punch blades 22 is properly selected depending on the material of the substrate 3 to be processed.

Subsequently, a method for manufacturing an imaging element using the device configuration described above is described.

Initially, two substrates 3, each composed of a flat thin metal plate, are stacked and placed on the table 16a for fixing thereon. The substrate 3 is a thin plate comprising one metal selected from, for example, aluminum, stainless steel, chromium, and molybdenum or an alloy of the two or more metals selected from these metals. These metals or alloys are suitable for processing with a punch and the punched surface (processed surface) has a high reflectance.

Although two substrates 3 are stacked for ensuring the positive punching of a substrate 3 using the downside substrate 3 as a setting board in the embodiment of the present invention, a single substrate 3 may be placed on the table 16a.

Before or after placing the substrate 3 on the table 16a, fixing of the blade section 2 on the horn 11 is confirmed to complete the advance preparation.

Subsequently, the ultrasonic welder 1 is activated for setting the oscillating frequency of the ultrasonic oscillator in the ultrasonic oscillation section 12 and the output of the servomotor in the lifting section 13 through the manipulation of the operation panel 17a. The oscillating frequency of the ultrasonic oscillator is properly set in a range of, for example, 15 kHz to 60 kHz depending on the material of the substrate 3. The output of the servomotor is set after specifying the contact position between the punch blade 22 and the substrate 3 and the punching completion position through preliminary teaching, such that the traveling between the contact position and the punching completion position is performed at a suitable processing speed for punching depending on the material of the substrate 3.

Subsequently, the ultrasonic oscillation section 12 and the lifting section 13 are activated under predetermined conditions to punch the substrate 3. The punch blades 22 are ultrasonic-vibrated at a predetermined oscillating frequency through the horn 11 with the ultrasonic oscillation section 12 during punching. Consequently, the punch blades 22 exhibit high cutting performance during traveling from the contact position with the substrate 3 to the punching completion position due to a synergetic effect of the vibration and the frictional heat between the blade and the substrate 3 resulting from the vibration.

Figure 3:
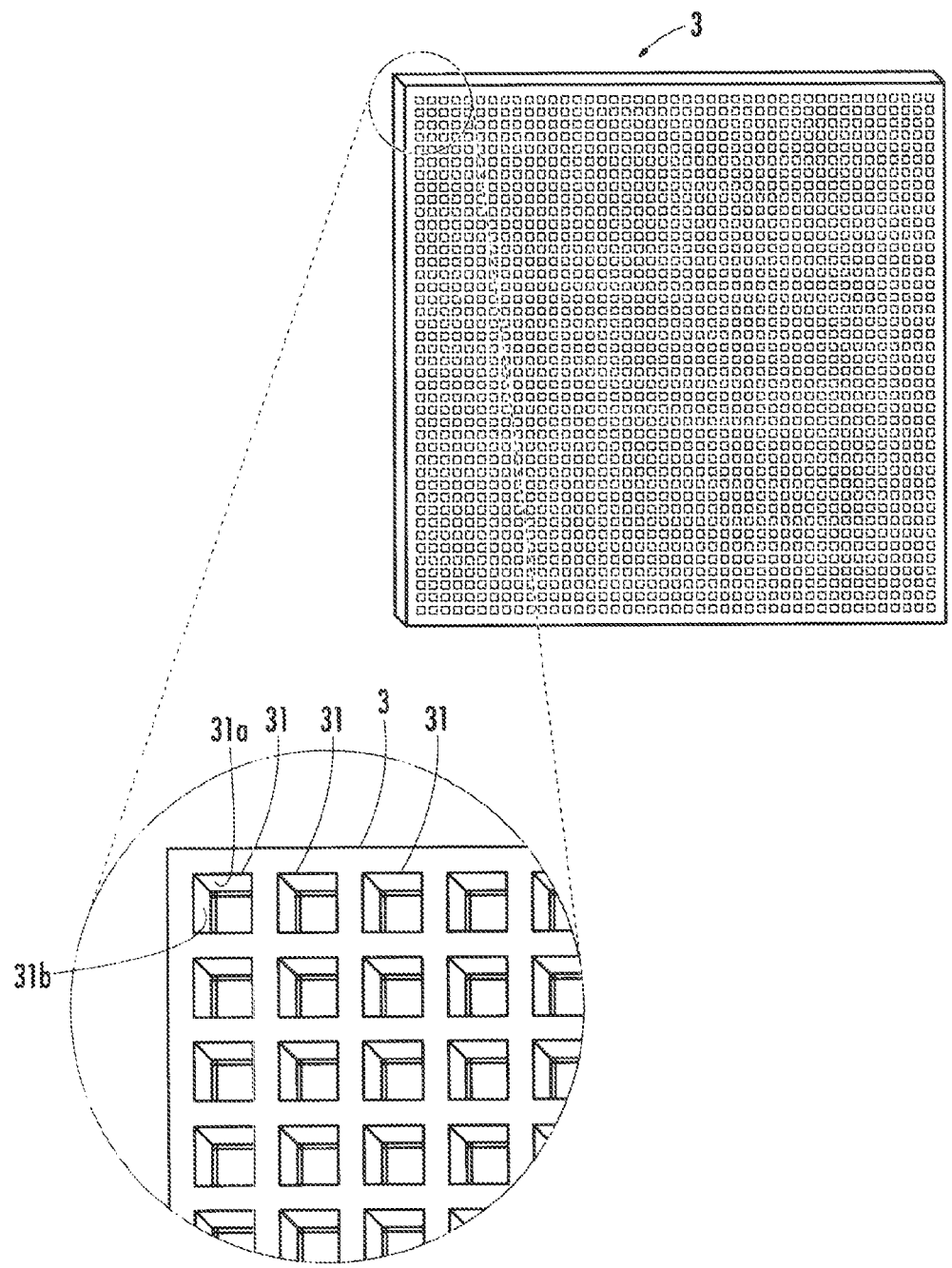
FIG. 3 is a perspective view of an imaging element formed with the punch blades shown in FIG. 2.

Thus, as shown in FIG. 3, a plurality of micro holes 31 is formed in the substrate 3 corresponding to the punch blades 22 in FIG. 2. The two neighboring inner sides 31a and 31b of the micro hole 31 corresponding to the two sides 22a and 22b of the punch blade 22 are mirror surfaces perpendicular to the substrate 3. Using metal as material for the substrate 3, the punched surface has a higher reflectance compared to the surface using the other material, and the inner mirror surfaces 31a and 31b can be produced without applying a reflection coating.

As described above, according to the embodiment of the method for manufacturing an imaging element, the imaging element can be readily manufactured by punching and highly smoothed minor surfaces precisely perpendicular to the surface of the substrate can be produced. As a result, an accurately processed imaging element can be readily manufactured for saving cost and time.

Subsequently, an example of the imaging element that was manufactured according to an embodiment of the method for manufacturing an imaging element is described below.

Figure 4:
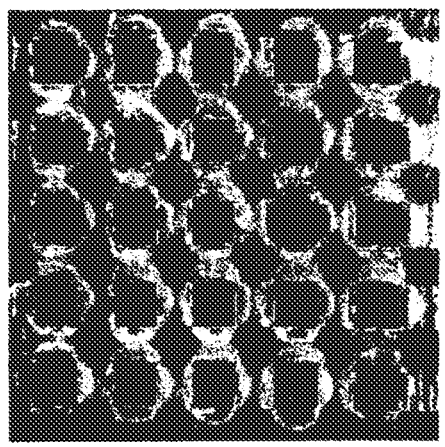
FIG. 4 is a microscope photograph of a manufactured imaging element.

FIG. 4 is a microscope photograph of an imaging element that was manufactured by processing an aluminum thin plate having a thickness of 100 μm as the substrate 3 by the method (applying 40-kHz ultrasonic vibration).

As shown in the microscope photograph in FIG. 4, the imaging element comprises square micro holes arranged lengthwise and crosswise corresponding to the punch blades 22. Since the squares have uniform sides and angles, it is comprehensible that each of the micro holes having a shape corresponding to the punch blade 22 has two neighboring inner surfaces that form mirror surfaces. Since a bright and clear image was actually produced using the imaging element shown in FIG. 4, it was proved that the micro holes have mirror surfaces with a high reflectance.

Figure 5:
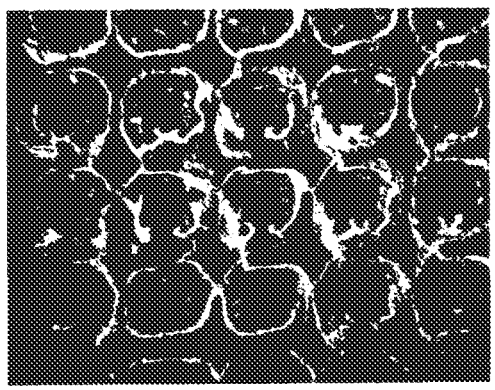
FIG. 5 is a microscope photograph of an imaging element in the case of applying no ultrasonic vibration.

In contrast, FIG. 5 is a microscope photograph of an imaging element without application of ultrasonic vibration. In that case, the conditions except for the presence or absence of the application of ultrasonic vibration were the same as for the case in FIG. 4.

In the microscope photograph in FIG. 5, the outlines of the micro holes are blurred. This indicates that the formed shapes of the micro holes do not correspond to the punch blades 22. In that case, no image was produced. It is comprehensible that no mirror surfaces were formed in the micro holes.

Subsequently, an imaging element was manufactured by processing a polycarbonate thin plate having a thickness of 100 μm as the substrate 3 by the method (applying 40-kHz ultrasonic vibration). In that case, uniformly arranged micro holes, each having a uniform shape, were formed in the same way as for the case in FIG. 4.

However, in that case, although an image was formed using the manufactured imaging element, a problem was that the image was dark. For dealing with the problem, an aluminum vapor deposited film having a thickness of 500 Å was formed on the surface of the manufactured imaging element. As a result, a bright and clear image was produced. It was proved that the reflectance of the mirror surfaces can be enhanced by coating the formed mirror surfaces in the micro holes with a reflective coat.

Although an ultrasonic vibration of 40 kHz was applied in the example described above, it was confirmed that equivalent imaging elements can be manufactured using any frequency in a range from 15 kHz to 60 kHz.

As described above, according to the embodiment of the method for manufacturing an imaging element, an accurately processed imaging element can be readily manufactured for saving cost and time.

In the present embodiment, the punch blades 22 were vibrated with the ultrasonic oscillation section 12. Alternatively, the table 16a may be vibrated with an ultrasonic oscillator disposed in the pedestal 16. In that case also, cutting performance during punching is enhanced due to a synergetic effect of the vibration and the frictional heat between the substrate 3 and the punch blades 22 resulting from the vibration, so that an accurately processed imaging element can be readily manufactured for saving cost and time

The invention claimed is:

1. A method for manufacturing an imaging element comprising a flat substrate with a plurality of vertical micro through-holes, each having two inner mirror surfaces perpendicularly arranged for bending a light beam passing through the hole such that a real image of an object or a projected image disposed in the space facing one side of the flat substrate is formed in a space facing the other side, comprising:

providing a blade section in which a plurality of punch blades is arranged to project from a block, each punch blade defined by a first side, a second side, a third side, and a fourth side, the first side and the second side being adjacent to each other and defining a first corner at an upper surface of the punch blade, the second side and third side being adjacent to each other and defining a second corner at an upper surface of the punch blade, the third side and the fourth side being adjacent to each other and defining a third corner at an upper surface of the punch blade, and the fourth side and the first side being adjacent to each other and defining a fourth corner at an upper surface of the punch blade, wherein the first side and the second side correspond to the mirror surfaces, the first corner is a tip of the punch blade and is disposed further from the block than the second corner, the third corner, and the fourth corner, and the upper surface of the punch blade is a portion of the punch blade opposite to an end of the punch blade which abuts the block;

pressing the blade section into contact with the substrate while ultrasonically vibrating the blade section, wherein the blade section is pressed into contact with the substrate such that the tips of the punch blades contact the substrate before any other portion of the punch blades; and punching the substrate with the punch blades.

2. The method for manufacturing an imaging element according to claim 1, wherein the substrate is a thin metal plate.

3. The method for manufacturing an imaging element according to claim 2, wherein the thin metal plate comprises any one metal selected from aluminum, stainless steel, chromium, and molybdenum or an alloy of the two or more metals selected therefrom.

4. The method for manufacturing an imaging element according to claim 1, further comprising the step of coating the mirror surfaces with a reflective coat after the substrate is punched with the punch blades, wherein the substrate is a thin resin plate.

5. The method for manufacturing an imaging element according to claim 1, wherein an end of the first side of each punch blade opposite to the block has an arcuate shape between the first corner and the fourth corner, and an end of the second side of each punch blade opposite to the block has an arcuate shape between the first corner and the second corner.

6. A method for manufacturing an imaging element comprising a flat substrate with a plurality of vertical micro through-holes, each having two inner mirror surfaces perpendicularly arranged for bending a light beam passing through the hole such that a real image of an object or a projected image disposed in the space facing one side of the flat substrate is formed in a space facing the other side, comprising:

providing a blade section in which a plurality of punch blades is arranged to project from a block, each punch blade defined by a first side, a second side, a third side, and a fourth side, the first side and the second side being adjacent to each other and defining a first corner at an upper surface of the punch blade, the second side and third side being adjacent to each other and defining a second corner at an upper surface of the punch blade, the third side and the fourth side being adjacent to each other and defining a third corner at an upper surface of the punch blade, and the fourth side and the first side being adjacent to each other and defining a fourth corner at an upper surface of the punch blade, wherein the first side and the second side correspond to the mirror surfaces, the first corner is a tip of the punch blade and is disposed further from the block than the second corner, the third corner, and the fourth corner, and the upper surface of the punch blade is a portion of the punch blade opposite to an end of the punch blade which abuts the block;

pressing the blade section into contact with the substrate while ultrasonically vibrating a pedestal with the substrate fixed thereon, wherein the blade section is pressed into contact with the substrate such that the tips of the punch blades contact the substrate before any other portion of the punch blades; and punching the substrate with the punch blades.

7. The method for manufacturing an imaging element according to claim 6, wherein an end of the first side of each punch blade opposite to the block has an arcuate shape between the first corner and the fourth corner, and an end of the second side of each punch blade opposite to the block has an arcuate shape between the first corner and the second corner.

* * * * *